(12) United States Patent
Perkins et al.

(10) Patent No.: US 11,250,264 B2
(45) Date of Patent: Feb. 15, 2022

(54) GEOGRAPHIC ADDRESS QUERY WITH ASSOCIATED TIME OF INQUIRY

(71) Applicant: Civic Resource Group International Incorporated, Los Angeles, CA (US)

(72) Inventors: Roderick Perkins, Menlo Park, CA (US); Peter Ellenby, Portland, OR (US); Thomas William Ellenby, San Jose, CA (US); Matthew Wong, Palo Alto, CA (US)

( * ) Notice: Subject to any disclaimer, the term of this patent is extended or adjusted under 35 U.S.C. 154(b) by 345 days.

(21) Appl. No.: 16/055,388

(22) Filed: Aug. 6, 2018

(65) Prior Publication Data
US 2019/0042845 A1 Feb. 7, 2019

Related U.S. Application Data

(60) Provisional application No. 62/541,655, filed on Aug. 4, 2017.

(51) Int. Cl.
| | |
|---|---|
| *G06K 9/00* | (2006.01) |
| *G06F 16/29* | (2019.01) |
| *G06F 16/58* | (2019.01) |
| *G06F 16/583* | (2019.01) |

(Continued)

(52) U.S. Cl.
CPC ......... *G06K 9/00671* (2013.01); *G06F 16/29* (2019.01); *G06F 16/58* (2019.01); *G06F 16/583* (2019.01); *G06F 16/907* (2019.01); *G06F 16/9537* (2019.01); *G06K 2209/27* (2013.01)

(58) Field of Classification Search
CPC .......... G06K 9/00778; G06K 9/00771; G06K 9/00993; G06K 9/03; G06Q 30/0281
See application file for complete search history.

(56) References Cited

U.S. PATENT DOCUMENTS

| 10,008,037 B1 | 6/2018 | Worley, III et al. |
| 2011/0234631 A1 | 9/2011 | Kim et al. |
| 2013/0083011 A1 | 4/2013 | Geisner et al. |

(Continued)

OTHER PUBLICATIONS

Arshad et al., "A freeze-object interaction technique for handheld augmented reality systems", vol. 75, Journal Multimedia Tools and Applications, URL: https://dl.acm.org/citation.cfm?id=2949467, dated May 10, 2016, pp. 5819-5839.

(Continued)

*Primary Examiner* — Duy M Dang
(74) *Attorney, Agent, or Firm* — Patent GC LLC; Alexander Franco (57) ABSTRACT

An application executing on a mobile device generates a geo-positional query including a time stamp representing the time of the query. The application can be, for example, an augmented reality application, a pointing search application, or a mapping application that searches based on geolocation and/or physical proximity. The query can include, in addition to a location, one or more of a direction, orientation, and camera field of view of the mobile device. A system processes the query to return a time-based state of an object and/or location addressed by the mobile device at the time of the query. The system can use the time stamp to identify which objects may have been located at a certain location at a certain time and/or to identify the state of located objects at a certain time. For example, the state of an electronic billboard can identify an advertisement displayed at the time.

20 Claims, 8 Drawing Sheets

(51) Int. Cl.
*G06F 16/907* (2019.01)
*G06F 16/9537* (2019.01)

(56) References Cited

U.S. PATENT DOCUMENTS

| | | |
|---|---|---|
| 2013/0232168 A1 | 9/2013 | Mcgregor et al. |
| 2015/0317685 A1 | 11/2015 | Maghoul |
| 2017/0132844 A1 | 5/2017 | Fateh et al. |
| 2017/0199919 A1 | 7/2017 | Liu |
| 2018/0011534 A1 | 1/2018 | Poulos et al. |

OTHER PUBLICATIONS

Serafini Kevin, "Sky Map—Astronomy App for Android", dated May 10, 2009, URL: https://www.youtube.com/watch?v=p6znyx0gjb4, Transcript Attached, 2 Pages.

GEOGRAPHIC ADDRESS QUERY WITH ASSOCIATED TIME OF INQUIRY

RELATED APPLICATIONS

The subject matter of this application is related to U.S. Provisional Application No. 62/541,655, filed on Aug. 4, 2017, which is hereby incorporated by reference in its entirety.

BACKGROUND OF THE INVENTION

When a user executes a geographic query with a mobile device, either to discover what is at their current location, latitude and longitude, or what they are addressing with their mobile device through the addition of a device's pointing direction to the query gained from a compass reading and/or gyroscopes, the user is usually shown what is being accessed at the time the query reaches the server and the result is then returned to the user. Based on network connectivity, this may take a matter of seconds or even minutes. During this time, the item the user had shown interest in may have changed or moved, and therefore the results to be returned to the user may no longer be relevant.

SUMMARY OF THE INVENTION

An application executing on a mobile device generates a geo-positional query including a time stamp representing the time of the query. The application can be, for example, an augmented reality application, a pointing search application, or a mapping application that searches based on geolocation and/or physical proximity. The query can include, in addition to a location, one or more of a direction, orientation, and camera field of view of the mobile device. A system processes the query to return a time-based state of an object and/or location addressed by the mobile device at the time of the query. The system can use the time stamp to identify which objects may have been located at a certain location at a certain time and/or to identify the state of located objects at a certain time. For example, the state of an electronic billboard can identify an advertisement displayed at the time.

In one embodiment, a geo-located query that includes the position of a mobile device includes an associated time stamp. The query can include the position and pointing direction of a mobile device. The pointing direction can be a three-dimensional pointing direction.

In one embodiment, query results can include static or dynamic geo-located objects addressed by (e.g. proximate to, pointed to or captured by a camera of) a mobile device, that may have a corresponding real world physical counterpart relating to the associated time stamp to users of Positional Search, Pointing Search, or augmented reality applications on the mobile device.

In one embodiment, the location and/or state of addressed geo-located objects corresponding to a time stamp associated with the query can be provided in response to a query.

A method can be performed by a computer and can include: determining an address state of a mobile device; determining a time associated with the determined address state; subsequent to the determined time, querying a database using the determined address state and the determined time to identify a thing matching the determined address state at the determined time; and based on the querying of the database, presenting to a user information related to a state of the thing at the determined time.

In various embodiment, the method can be performed as follows. The address state can include a physical location of the mobile device. The address state can further include a pointing direction of the mobile device. The address state can further include a field of view of an imaging device associated with the mobile device. The thing can be an object. The information can be presented in an augmented reality interface aligned with a captured image of the object. The information can include a maintenance record for the object. The database can be a database of geolocated objects having time-based states. The querying can include performing a proximity comparison between the location of the mobile device and locations of the geolocated objects. The identified thing can be an electronic billboard displaying different advertisements at different times, and the state of the thing at the determined time can include information related to an advertisement displayed on the electronic billboard at the determined time. The identified thing can be a location, and the state of the thing at the determined time can include an identification of a moveable object present at the location at the determined time. The moveable object can be a person. The moveable object can be a vehicle. The vehicle can be a train and the location can be a train station. The thing can be an event. The event can be selected from a group consisting of: a sporting event, a concert, and a show. The event can be a promotional offer. The method can further include determining that the promotional offer has been presented to fewer than a maximum number of allowed users. The address state can include a velocity of the mobile device. The address state of the mobile device can be determined in response to a user input to the mobile device.

A system can include one or more computers having one or more processors and a non-volatile memory, where the non-transitory memory is encoded with computer instructions that can cause the one or more processors to perform the foregoing methods in one or more embodiments.

A non-transitory computer readable medium can be encoded with computer instructions that can cause one or more processors of a system including one or more computers to perform the foregoing methods in one or more embodiments.

DETAILED DESCRIPTION

In the following description, references are made to various embodiments in accordance with which the disclosed subject matter can be practiced. Some embodiments may be described using the expressions one/an/another embodiment or the like, multiple instances of which do not necessarily refer to the same embodiment. Particular features, structures or characteristics associated with such instances can be combined in any suitable manner in various embodiments unless otherwise noted.

An application executing on a mobile device generates a geo-positional query including a time stamp representing the time of the query. The application can be, for example, an augmented reality application, a pointing search application, or a mapping application that searches based on geolocation and/or physical proximity. The query can include, in addition to a location, one or more of a direction, orientation, and camera field of view of the mobile device. A system processes the query to return a time-based state of an object and/or location addressed by the mobile device at the time of the query. The system can use the time stamp to identify which objects may have been located at a certain location at a certain time and/or to identify the state of located objects at a certain time. For example, the state of an electronic billboard can identify an advertisement displayed at the time.

The system can generate accurate and relevant geolocational query results for users using a multitude of platforms such as location search, augmented reality (AR) and pointing search through the addition of the time stamp to a geo-locational query. The system can make results from geo-located queries submitted with positional, pointing based and AR applications more relevant to users by using this time stamp to confirm what object was addressed at that time and/or a state of the addressed object at the time of query.

An address state of a mobile device at any given moment in time may include any one or more of: position, pointing direction, speed, velocity, acceleration, direction of motion, vibration, and slew rate. If the mobile device has a camera, the address state may also include one or more of: field of view of camera, lens information, and zoom state of camera.

A Time Stamp System ("TSS") may be envisaged as two processes, a capture of a mobile device Time Stamp Address State ("TSAS") by a Time Stamp Capture System ("TSCS"), and a searching of a database of geolocated objects utilizing the captured TSAS to return results relating to geolocated objects that were in that vicinity, direction or field-of-view at that time as they were at that time, by a Time Stamp Recall System ("TSRS"). These two processes may take place at separate times as described in FIGS. 1-3 and related text or one immediately after the other, i.e. as one continuous method, as described in FIG. 4 and related text. The TSCS and the TSRS in combination may also be referred to as a system.

Figure 1:
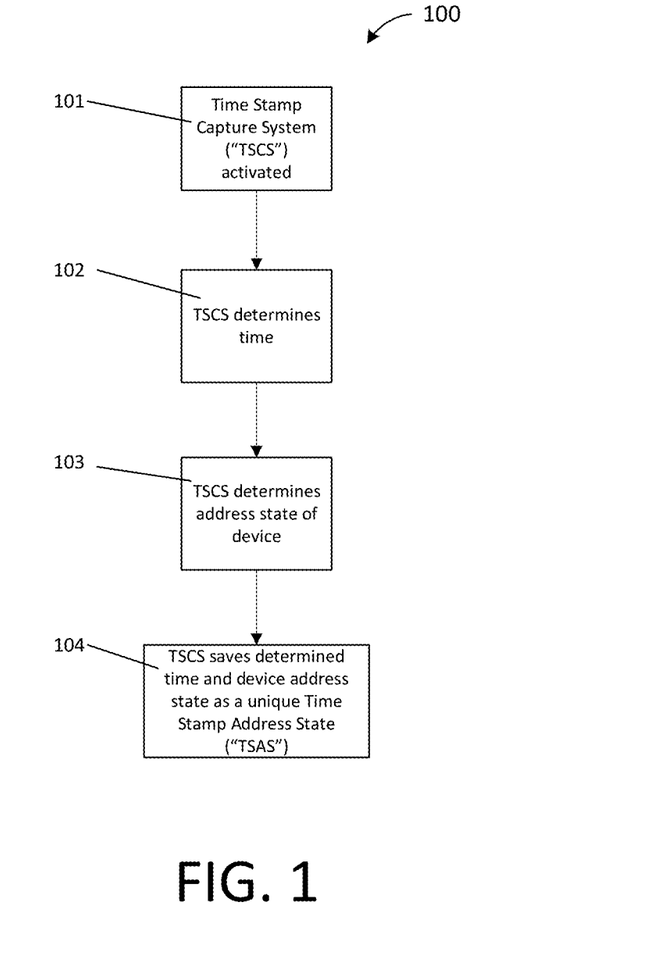
FIG. 1 illustrates a method performed by a system to acquire a Time Stamp Address State ("TSAS") for a mobile device.

FIG. 1 illustrates a method performed by a system to acquire a Time Stamp Address State ("TSAS") for a mobile device. In step 101, a user of the system activates the Time Stamp Capture System ("TSCS"). The flowchart then branches to step 102. In step 102, the system determines the time. The format of the determined time, e.g. UTC, adjusted for local time relative to the location of the mobile device, etc., can be defined by the application. The flowchart then branches to step 103. In step 103, the TSCS determines the address state of the mobile device. The address state can include the determined position in 2 or 3 dimensions of the mobile device. In addition, the address state of a mobile device can include some or all of heading (i.e. pointing direction) in 2 or 3 dimensions, velocity, acceleration, direction of motion, vibration rate, and slew rate and, if the mobile device includes a camera, field of view, lens characteristics and zoom state, and captured image data. The flowchart then branches to step 104. In step 104, the TSCS saves the determined time and device address state as a unique Time Stamp Address State ("TSAS").

Figure 2:
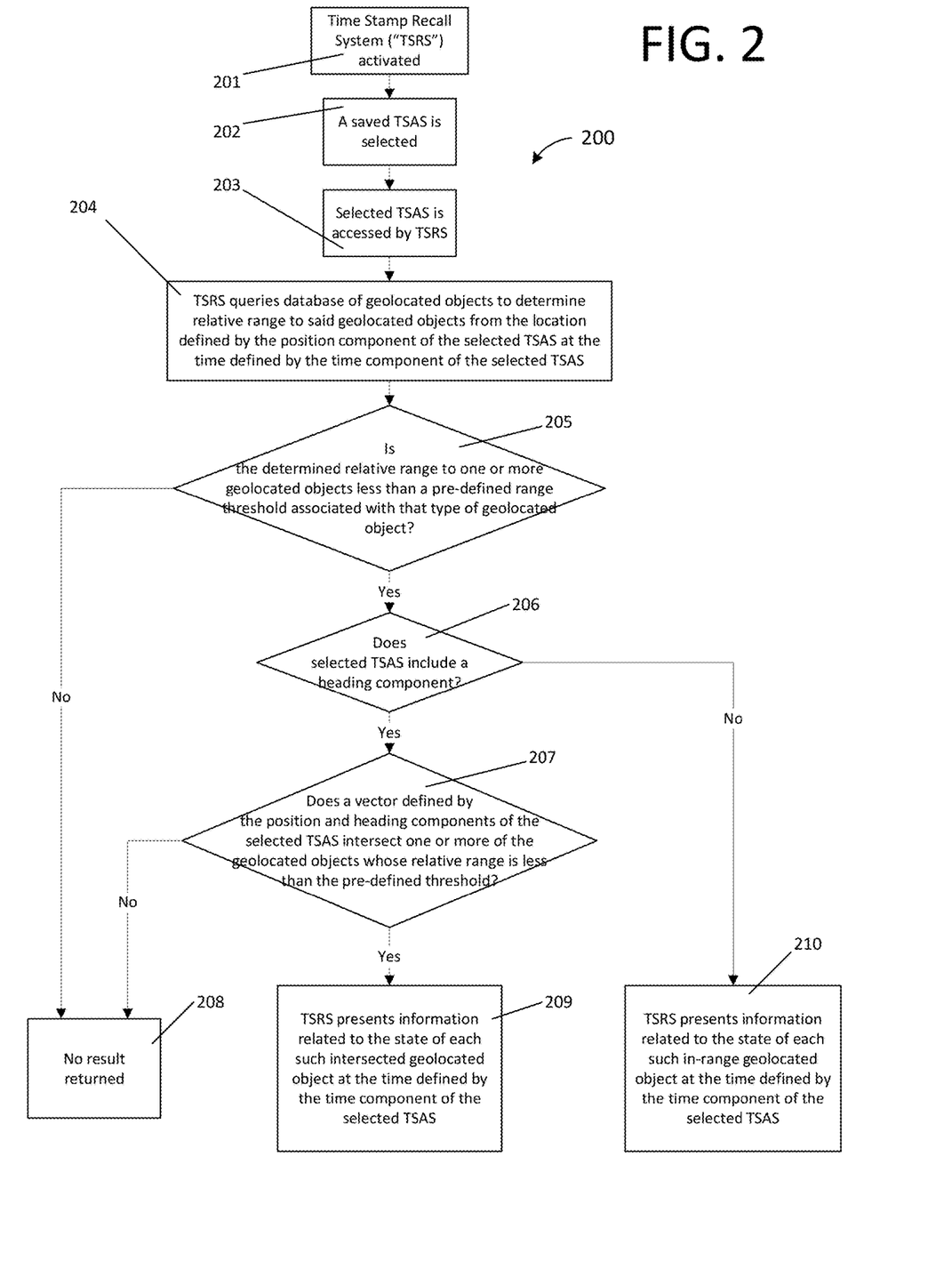
FIG. 2 illustrates a method performed by the system where the TSAS includes time, position and potentially heading components.

FIG. 2 illustrates a method performed by the system where the TSAS includes time, position and potentially heading components. In step 201, the timestamp Recall System ("TSRS") is activated. The flowchart then branches to step 202. In step 202, a saved TSAS is selected either by a user of the system or automatically by the system itself. The flowchart then branches to step 203. In step 203, the selected TSAS is accessed by the TSRS. The flowchart then branches to step 204. In step 204, the TSRS queries a database of geolocated objects to determine the relative ranges to said geolocated objects from the position defined by the position component of the TSAS at the time defined by the time component of the TSAS. For example, the system determines the range to the geolocated objects at the time that the TSAS was created. The flowchart then branches to step 205. In step 205, the TSRS determines if the determined range one or more geolocated objects is less than a pre-defined threshold associated with that type of object, i.e. restaurants may have a range threshold of 500 m while mountains may have a range threshold of 10 km. If the range to one or more of the geolocated objects is less than the pre-defined object type specific range thresholds, then the flowchart branches to step 206. If the range to one or more of the geolocated objects is not less than the pre-defined object type specific range thresholds, then the flowchart branches to step 208 in which no result is returned. In step 206, the TSRS determines if the selected TSAS includes a heading component. If the selected TSAS does include a heading component, the flowchart branches to step 207. If the selected TSAS does not include a heading component, the flowchart branches to step 210 in which the TSRS presents information related to the state of each such object within range at the time specified by the time component of the TSAS, i.e. the system returns a time specific result for each object within range. In step 207, the system determines whether a vector defined by the position and heading components of the TSAS intersects one or more of the within range geolocated objects. If one or more of the geolocated objects is intersected by the vector, then the flowchart branches to step 209. If one or more of the geolocated objects is not intersected by the vector, then the flowchart branches to step 208 in which no result is returned. In step 209, the TSRS presents information related to the state of each such object so intersected at the time specified by the time component of the TSAS, i.e. the system returns a time specific result for each object within range that is being "pointed at".

Figure 3:
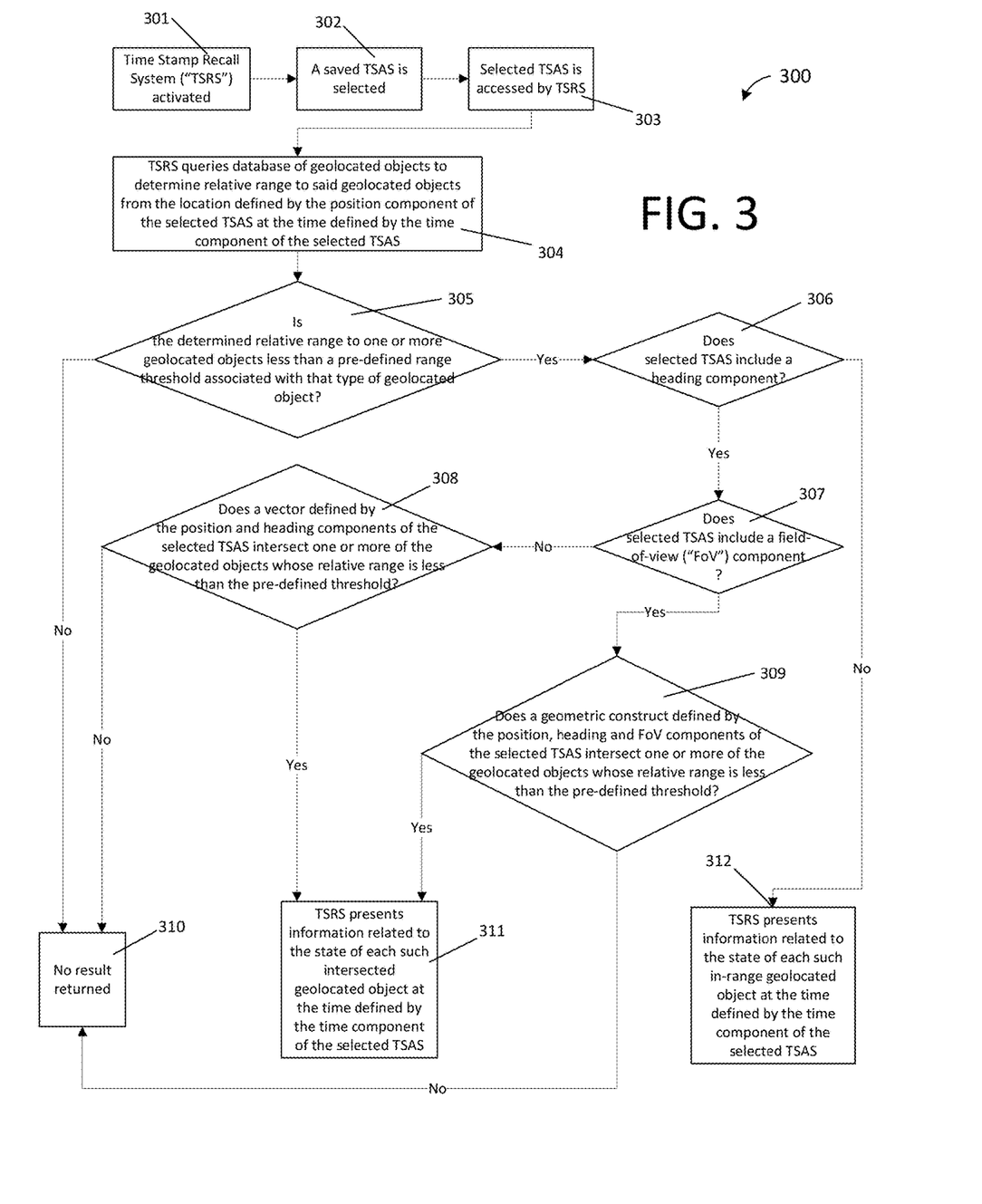
FIG. 3 illustrates a method performed by the system where the TSAS includes time, position and potentially heading and field-of-view components.

FIG. 3 illustrates a method performed by the system where the TSAS includes time, position and potentially heading and field-of-view components. In step 301, the timestamp Recall System ("TSRS") is activated. The flowchart then branches to step 302. In step 302, a saved TSAS is selected either by a user of the system or automatically by the system itself. The flowchart then branches to step 303. In step 303, the selected TSAS is accessed by the TSRS. The flowchart then branches to step 304. In step 304, the TSRS queries a database of geolocated objects to determine the relative ranges to said geolocated objects from the position defined by the position component of the TSAS at the time defined by the time component of the TSAS. For example, the system determines the range to the geolocated objects at the time that the TSAS was created. The flowchart then branches to step 305. In step 305, the TSRS determines if the determined range one or more geolocated objects is less than a pre-defined threshold associated with that type of object. If the range to one or more of the geolocated objects is less than the pre-defined object type specific range thresholds, then the flowchart branches to step 306. If the range to one or more of the geolocated objects is not less than the pre-defined object type specific range thresholds, then the flowchart branches to step 610 in which no result is returned. In step 306, the TSRS determines if the selected TSAS includes a heading component. If the selected TSAS does include a heading component, the flowchart branches to step 307. If the selected TSAS does not include a heading component, the flowchart branches to step 312 in which the TSRS presents information related to the state of each such object within range at the time specified by the time component of the TSAS, i.e. the system returns a time specific result for each object within range. In step 307, the TSRS determines whether the TSAS includes a field-of-view ("FoV") component. If the TSAS does include a FoV component, the flowchart branches to step 309. If the TSAS does not include a FoV component, the flowchart branches to step 308. In step 308, the TSRS determines whether a vector defined by the position and heading components of the TSAS intersects one or more of the within range geolocated objects. If one or more of the geolocated objects is intersected by the vector, then the flowchart branches to step 311. If one or more of the geolocated objects is not intersected by the vector, then the flowchart branches to step 310 in which no result is returned. In step 311, the TSRS presents information related to the state of each such object so intersected at the time specified by the time component of the TSAS, i.e. the system returns a time specific result for each object within range that is being "pointed at". In step 309, the TSRS determines if a geometric construct defined by the position, heading and FoV components of the TSAS intersects one or more of the within range geolocated objects. If one or more of the geolocated objects is intersected by the geometric construct, then the flowchart branches to step 311. If one or more of the geolocated objects is not intersected by the vector, then the flowchart branches to step 310 in which no result is returned. In step 311, the TSRS presents information related to the state of each such object so intersected at the time specified by the time component of the TSAS, i.e. the system returns a time specific result for each object within range that is "within view". It should be noted that information relating to the "within view" objects may be overlaid on an image captured at the same time that the TSAS is captured, i.e. the TSAS may further include an image component if the mobile device also includes a camera or may be displayed overlaid on a completely virtual image generated utilizing the various components of the TSAS.

Figure 4:
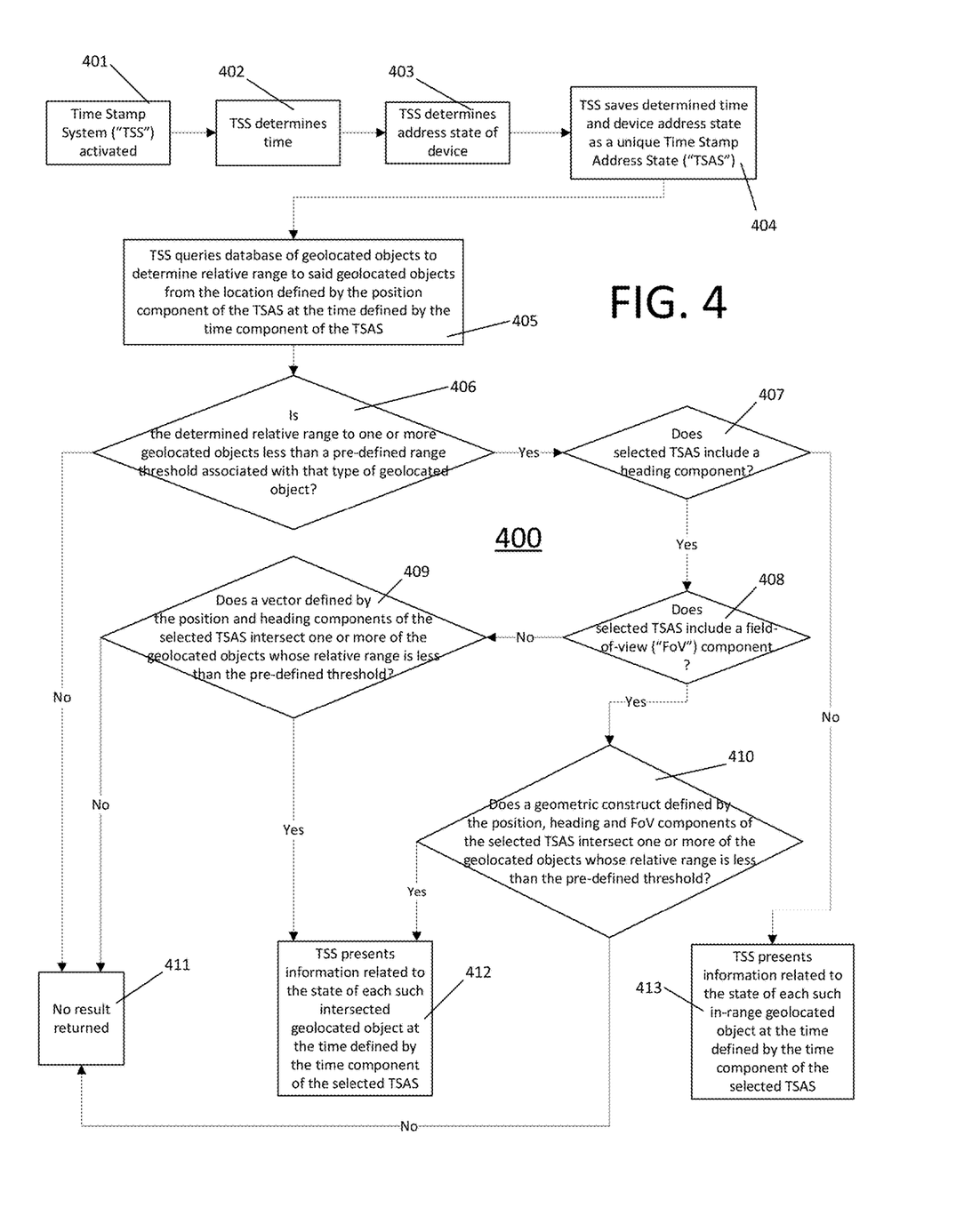
FIG. 4 illustrates a method performed by the system where the TSAS is captured and then utilized to return a result.

FIG. 4 illustrates a method performed by the system where the TSAS is captured and then utilized to return a result. In step 401, the timestamp System ("TSS") is activated. The flowchart then branches to step 402. In step 402, the TSS determines the time. The flowchart then branches to step 403. In step 403, the TSS determines the address state of the mobile device. The address state can include the determined position of the mobile device. In addition, the address state of a mobile device can include some or all of heading (i.e. pointing direction) in 2 or 3 dimensions, velocity, acceleration, direction of motion, vibration rate, and slew rate and, if the mobile device includes a camera, field of view, and lens characteristics and zoom state. The flowchart then branches to step 404. In step 404, the TSS saves the determined time and device address state as a unique Time Stamp Address State ("TSAS"). The flowchart then branches to step 405. In step 405, the TSS queries a database of geolocated objects to determine the relative ranges to said geolocated objects from the position defined by the position component of the TSAS at the time defined by the time component of the TSAS. For example, the system determines the range to the geolocated objects at the time that the TSAS was created. The flowchart then branches to step 406. In step 406, the TSS determines if the determined range one or more geolocated objects is less than a pre-defined threshold associated with that type of object. If the range to one or more of the geolocated objects is less than the pre-defined object type specific range thresholds, then the flowchart branches to step 407. If the range to one or more of the geolocated objects is not less than the pre-defined object type specific range thresholds, then the flowchart branches to step 411 in which no result is returned. In step 407, the TSS determines if the selected TSAS includes a heading component. If the selected TSAS does include a heading component, the flowchart branches to step 409. If the selected TSAS does not include a heading component, the flowchart branches to step 413 in which the TSRS presents information related to the state of each such object within range at the time specified by the time component of the TSAS, i.e. the system returns a time specific result for each object within range. In step 408, the TSS determines whether the TSAS includes a field-of-view ("FoV") component. If the TSAS does include a FoV component, the flowchart branches to step 410. If the TSAS does not include a FoV component, the flowchart branches to step 409. In step 409, the TSS determines whether a vector defined by the position and heading components of the TSAS intersects one or more of the within range geolocated objects. If one or more of the geolocated objects is intersected by the vector, then the flowchart branches to step 412. If one or more of the geolocated objects is not intersected by the vector, then the flowchart branches to step 411 in which no result is returned. In step 412, the TSS presents information related to the state of each such object so intersected at the time specified by the time component of the TSAS, i.e. the system returns a time specific result for each object within range that is being "pointed at". In step 410, the TSS determines if a geometric construct defined by the position, heading and FoV components of the TSAS intersects one or more of the within range geolocated objects. If one or more of the geolocated objects is intersected by the geometric construct, then the flowchart branches to step 412. If one or more of the geolocated objects is not intersected by the vector, then the flowchart branches to step 411 in which no result is returned. In step 412, the TSS presents information related to the state of each such object so intersected at the time specified by the time component of the TSAS, i.e. the system returns a time specific result for each object within range that is "within view". It should be noted that information relating to the "within view" objects may be overlaid on an image captured at the same time that the TSAS is captured, i.e. the TSAS may further include an image component, if the mobile device also includes a camera or may be displayed overlaid on a completely virtual image generated utilizing the various components of the TSAS.

Further understanding may be gained from the following examples of the systems and methods of the invention in operation.

Figure 5A:
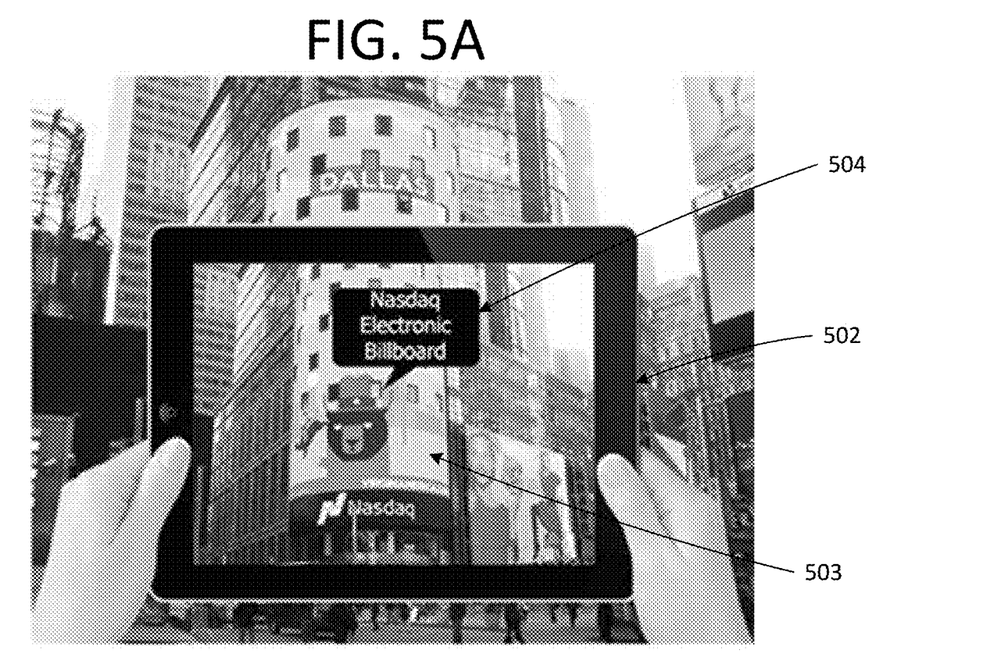
FIGS. 5A and 5B are composite photograph illustrations of a user using an augmented reality application to query information about an electronic billboard.
Figure 5B:
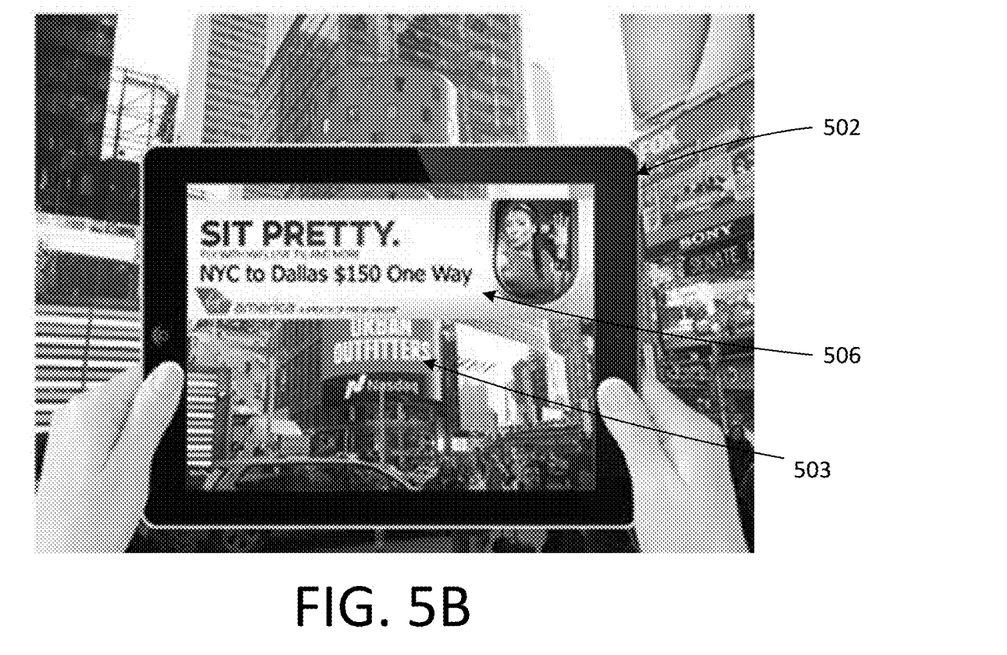

FIGS. 5A and 5B are composite photograph illustrations of a user using an augmented reality application to query information about an electronic billboard. In this example, a mobile device running an augmented reality (AR) application is being used to explore the local area. The user is shown results relating to the content, the state, of the billboard at the time a query is generated as opposed to relating to what may be displayed on the electronic billboard at the time the query is processed. FIG. 5A shows the system in action at the time of the TSAS capture, and FIG. 5B shows the system at the time of the returned result. The AR application running on a tablet 502 utilizes the device's position and pointing direction to determine the object(s) being addressed and layers that information in the form of computer generated graphics over a live camera feed in the device's display. A user of the device notices an electronic billboard 503 in their view with an AR icon 504 hovering over the billboard inviting them to interact and engage with the object. In the illustrated photograph, the electronic billboard being addressed by the device is the non-traditional and actually covers the whole face of the Nasdaq Tower, which is the round building in the foreground. The user of the device is interested in the product currently being displayed on the electronic billboard so they select the icon to interact with the billboard and find out more about the product. Moments after they have selected the icon for the billboard, the item being advertised on the electronic billboard changes. The query they sent to the system contains a time stamp of their inquiry and therefore the results returned to the user relate to the content displayed on the billboard at the time of address and do not relate to the content that is subsequently being displayed when the query is processed by the system. The time stamp of the query is compared to a database that tracks the content and time of display for each advertisement on the electronic billboard, and therefore the advertisement on display at the time of query is the one accessed to generate a response to the user. With this system, a user interacting with an electronic billboard will be shown results 506 relating to the content, i.e. the state, of the billboard at the time of their query and not results relating to what is subsequently or currently being displayed on the electronic billboard 503.

With regard to the example described above and illustrated in FIGS. 5A and 5B, the method illustrated in FIG. 4 may apply as follows. The user of device clicks to save time stamp (step 401). The TSS determines time (step 402). The TSS determines position, heading and FoV data for the mobile device (step 403). The TSS saves the TSAS of the mobile device (step 404). The TSS queries geolocated object database to determine the range to local object and determines that the NASDAQ Billboard geolocated object (object type: physical advertising with range threshold of 500 m) is with range (steps 405 & 406). The TSS determines that TSAS does include heading and FoV components (steps 407 & 408). The TSS determines that NASDAQ Billboard geolocated object is intersected by the geometric construct defined by the time, position, heading and FoV components of the TSAS (step 410). The TSS displays information relating to the NASDAQ Billboard geolocated object (step 412) that was being displayed at the time the TSAS was captured. This information may be displayed aligned to a generated image of the scene as defined by the time, position, heading and FoV components of the TSAS or, if the TSAS also comprises a captured image (i.e. the mobile device also comprises a camera and an image was captured at the time the TSS was activated), the information relating to the NASDAQ Billboard geolocated object may be displayed aligned to this still image. Alternately the time stamped information may itself be displayed as a geolocated object to be viewed dynamically by the AR system whose position is that of the NASDAQ Billboard geolocated object.

A further example of the invention can be understood through a type of geo-located object that often has a changing state, such as the home plate of a baseball diamond and its changing occupants, the batters. For this example, a user uses a pointing search application on a mobile device to enquire about the batter currently at bat at the game the user is attending. A pointing search can use the mobile device's position and pointing direction or orientation to determine the object being addressed or in this case, pointed at by the mobile device. The user points their device towards the home plate, for example, by aligning a predetermined direction of orientation of the device, such as a side edge or a perpendicular to a back side, with the home plate and submits a query. In this instance, the information the user seeks to access, additional information about the current batter, might not be displayed on the scoreboard of the stadium for ready consumption. For example, perhaps the user is interested in the batter's date of birth, minor league experience, and home town. The query can include a time stamp that corresponds to the game's time record, and the time stamp can be utilized to determine when each batter was up to bat at home plate. Once the query is received by the server it in conceivable that the batter the user was inquiring about may not be at bat anymore, e.g. the batter may now be on base, have hit a home run, recorded an out, etc. Without the time stamp attached to the query the user could be given information about the then current batter and not about the batter the user was querying the system about. In this manner, their query is properly responded to.

In a next example, a user is in downtown Las Vegas using a positional application on a mobile device to discover their location and nearby objects. The system determines that the user is on Fremont St. under the domed part of the street where the Fremont Street Experience VivaVision light shows are displayed above the pedestrians surrounded by various casinos. At this moment the user is between the Binion's and Golden Nugget casinos at the corner of Fremont and South Casino Center Boulevard watching the intricate video light show above and listening to the accompanying music that is played through speakers along Fremont St. The current show is a tribute to the band "The Who" and various tracks from the band's career are being played along with a multi-media graphic light show on a curved screen above. The user sees a photo of the band playing live above them on the screen and they wonder who the photographer is that took the photo. They also can't quite place the song being played at that moment and would also like to know the name of the track and possibly purchase it because they like it so much. They submit their locational query to the system with its accompanying time stamp, and the system then compares the query to what was happening in the VivaVision show at the time of the query above the user's location, as distinguished from what may be displayed above the user at the time the query is processed, since the show is very dynamic and may have changed by the time the query is processed. The system also determines what song was being played at the time of the user's query. The system determines that the photo of "The Who" over the user at their time of query was taken by the photographer Jim Marshall and the song being played at the time of query was Slip Kid, from the band's 1975 album, "The Who By Numbers". The user likes the photograph and the song so much that they purchase a print of the photo and the entire album through links to the appropriate merchants provided by the system.

Figure 6A:
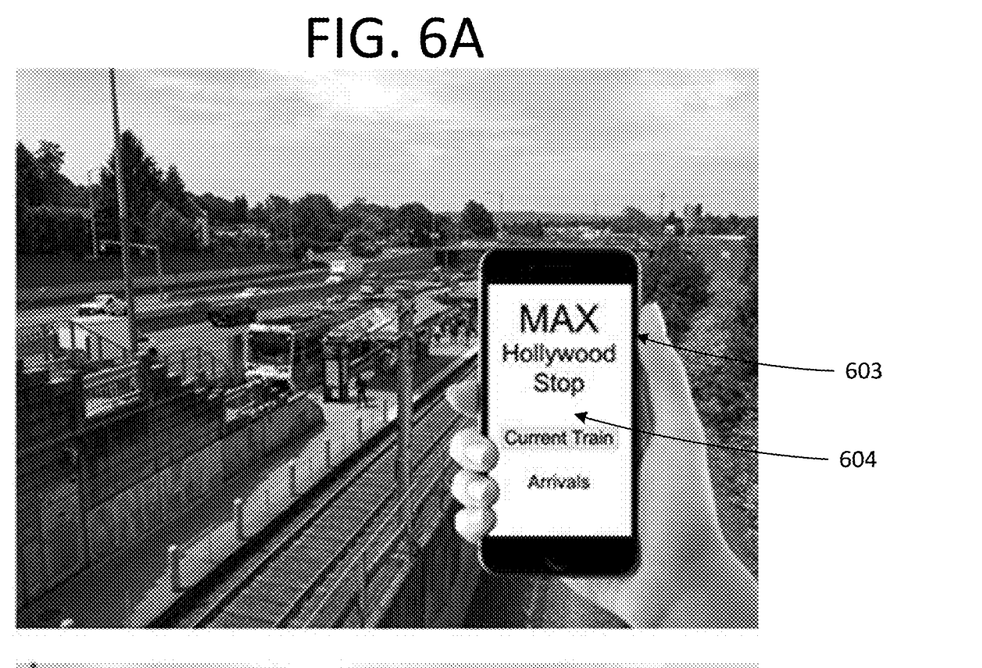
FIGS. 6A and 6B are composite photograph illustrations of a user using a positional application to query information about a light rail station.
Figure 6B:
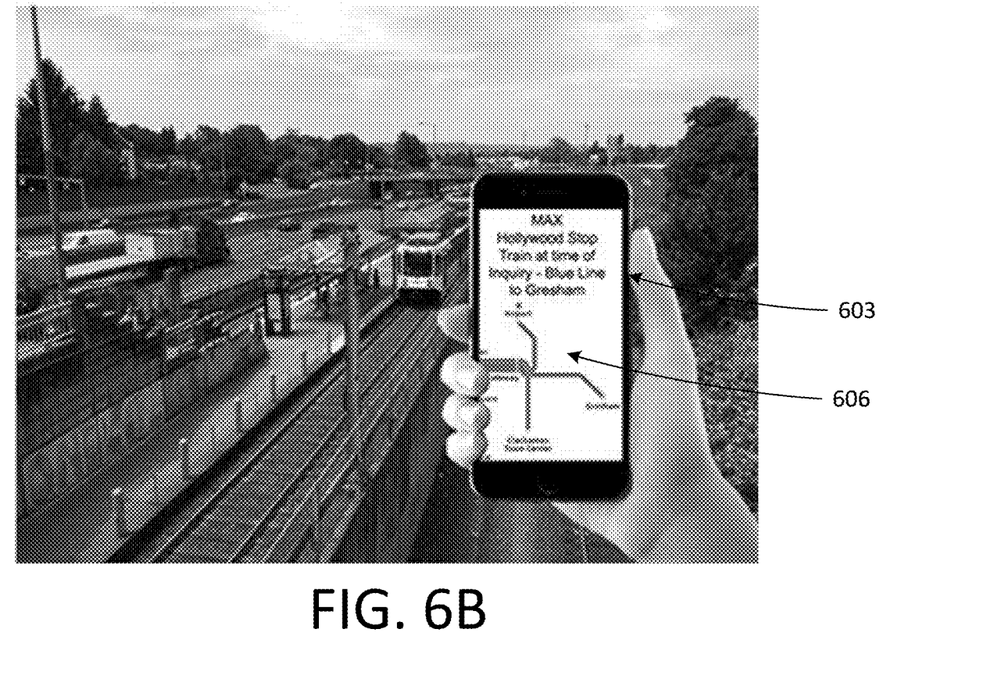

FIGS. 6A and 6B are composite photograph illustrations of a user using a positional application to query information about a light rail station in a next example. FIG. 6A shows the system in action at the time of the TSAS capture, and FIG. 6B shows the time of the returned result. A user is using a positional application 604 on their mobile device 603 to interact with a MAX light rail station in Portland, Oreg. The system determines through the mobile device's positioning system (e.g. GPS, GLONAS) that the user is at the Hollywood MAX station. The user queries the system to find out about the train that is currently in the Hollywood MAX station. The train quickly pulls away and by the time the query is processed by the server, another train, traveling in the opposite direction, now occupies the station. Because the user's query has an attached time stamp, the system can determine what train occupied the station at the time of the query. The user is then shown results 606 relating to the train that occupied the station at the time of the query as opposed to results relating to the train that may be in the station when the query is received and/or processed. The results of the query, therefore, satisfy the demands of the user, and the user learns that the train they inquired about was a Blue Line train traveling towards Gresham.

By way of another example, when one is out and about with a mobile device, it is possible to encounter situations that can drastically alter the speed of one's mobile device's connection to the internet. From 3G, 4G, 4G LTE and different Wi-Fi hotspots, the connection speeds experienced by users, even users in the same location, will rarely be the same. Suppose a company decides to run a promotion based on users interacting with billboards in New York. The company makes it known via social media that at precisely 6 p.m. the first one hundred users to point their mobile device at a specified billboard will receive a special coupon code. As six o'clock comes around, quite a crowd has gathered at the billboard and people are pointing their phones and sending in their entries as soon as the clock strikes 6 p.m. Differing network transmission rates may cause queries to reach the server at different times, and a user who interacted in the proper way with the billboard may have their entry reach the system servers after another user's entry, i.e. a user on a faster network, even though the user submitted it first. By targeting each entry, query or submission with a time stamp relating to the user's time of interaction with the billboard, as opposed to the arrival time at the server, the true first one hundred people to interact with the billboard can be determined. Those users, and not others' whose entries may have reached the server first due to better network connectivity, are justly rewarded with the special coupon code.

Figure 7A:
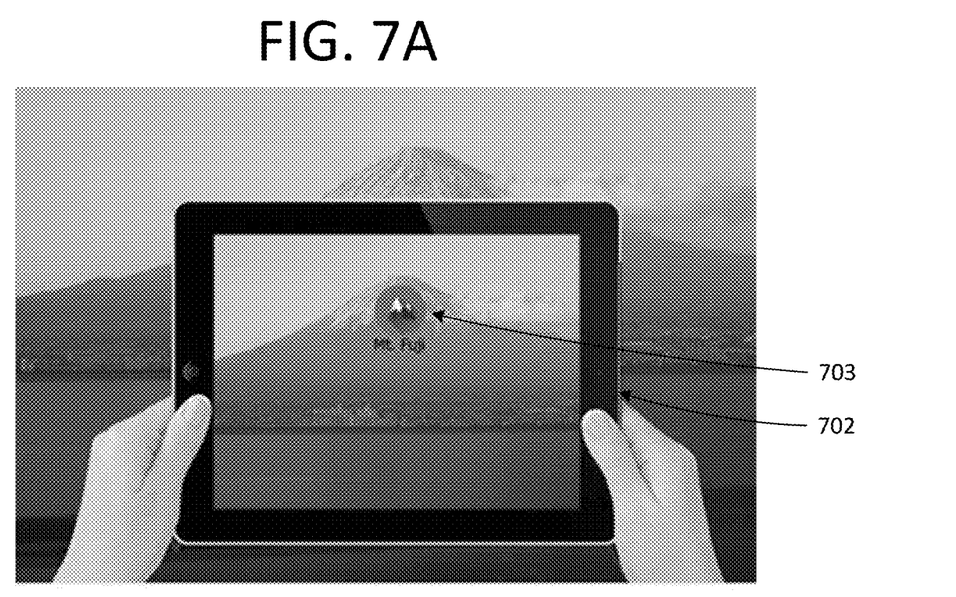
FIGS. 7A and 7B are composite photograph illustrations of a user using an AR application while traveling on a high-speed train to query information about Mt. Fuji.
Figure 7B:
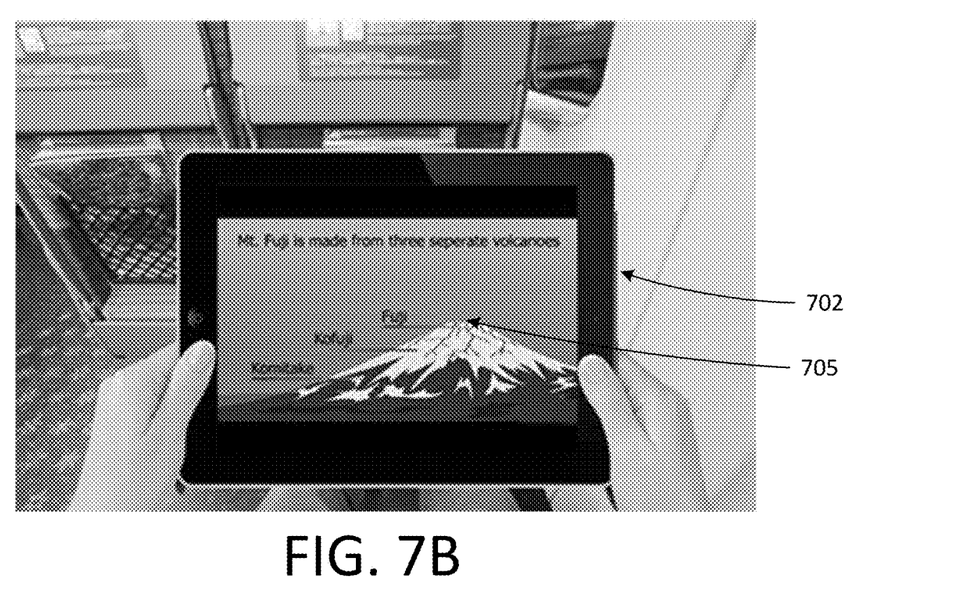

FIGS. 7A and 7B are composite photograph illustrations of a user using an AR application to explore Japan while they travel in a window seat on the high-speed Shinkansen train network, in a next example. FIG. 7A shows the system in action at the time of the TSAS capture to query information about Mt. Fuji, and FIG. 7B shows the returned result. The Shinkansen train network carries trains that regularly travel at speeds of 200 miles per hour, and at 200 MPH, the train can travel five miles in just 1.5 minutes. The AR application, running on a tablet 702, will probably do an excellent job at labeling the surrounding points of interest for the user with AR tags, but if the user seeks to address, interact with and learn about a specific object, the speed of the train and therefore the velocity of the device can make this problematic. AR applications rely on the device being pointed at and viewing an object a user has focused their attention and curiosity on to generate graphics for the user based on these dynamic parameters. It would be beneficial for the system to track the velocity of a user's mobile device, and if the mobile device is traveling at speeds that would make interaction with an addressed object difficult due to the device's speed and therefore the time the object will be in view for the user, it would be of use to generate graphics based on the time stamp relating to the user's query of an object.

Once the user addresses the object, the time stamp of their mobile device's position and orientation at the time of address are used to generate the graphics for the user so they may interact with the object for as long as they wish, not just the time it is in the user's view. In this manner, the user can interact with and learn about the object for a long as they want even if that object it is now many miles away. In this example, the user has selected Mt. Fuji 703 as an object they wish to interact with after addressing it with their AR application. Since the time stamp is used for the generation of their interaction with the object, the system no longer needs to rely on the positioning and heading generated by the device as they move along the track, but only the capture state associated with the query's unique time stamp. The user can then learn all about Mt. Fuji, its geology, unique weather patterns and general history through graphics 705 that relate to the user's unique view of the mountain from the train's window when they made their initial query. It may also be the case that the user on the high-speed train wants to enquire about another Shinkansen train traveling in the opposite direction at the same speed with their AR device. Two trains passing at this speed will most likely pass each other in a few seconds, it may not be possible or practical to generate graphics based on a user's relation to the train they have submitted a query about. The system can, however, use the time stamp associated with a user's query to, for example, generate graphics and provide the desired information about the passing train, the destination and the stops along the way, what year it was built and its current speed.

With regard to the example described above and illustrated in FIGS. 7A and 7B, the method illustrated in FIG. 4 may apply as follows. The user of device clicks to save time stamp (step 401). The TSS determines time (step 402). The TSS determines position, heading and FoV data for the mobile device (step 403). The TSS saves the TSAS of the mobile device (step 404). The TSS queries geolocated object database to determine the range to local object and determines that Mt. Fuji (object type: geological point of interest with range threshold of 35 km) is with range (steps 405 & 406). The TSS determines that TSAS does include heading and FoV components (steps 407 & 408). The TSS determines that Mt. Fuji geolocated object is intersected by the geometric construct defined by the time, position, heading and FoV components of the TSAS (step 410). The TSS displays information relating to the Mt. Fuji geolocated objects (step 412). This information may be displayed aligned to a generated image of the scene as defined by the time, position, heading and FoV components of the TSAS or, if the TSAS also comprises a captured image (i.e. the mobile device also comprises a camera and an image was captured at the time the TSS was activated), the information relating to the Mt. Fuji geolocated object may be displayed aligned to this still image.

In another example, a city worker is using an AR application to check the maintenance records and needed repairs for a municipality's network of street lamps. The user is stopped on a block face, is viewing the street lamps on the block face through an AR device and is being shown AR graphics overlaid onto each street lamp relating to the maintenance records for each street lamp. While panning the device along the block face the user is shown AR graphics corresponding to a particular street lamp that is in need of extensive service. The user is informed that there is an instructional graphic AR video to view in order to properly perform the tasks needed for repair. These instructional graphics are generated for the user and shown to them in relation to their unique perspective of the street lamp based on their AR device's position and 3D pointing direction. In this instance, the mobile device can be a ruggedized tablet computer running the AR application and the user is told the video will be roughly 5 minutes long. The user doesn't want to hold the tablet up in the AR viewing state for the street lamp so they generate a time stamp based on the device's initial query about the street lamp. Fully computer-generated graphics are created based on the time stamp and the device's position and 3D pointing direction. These graphics, showing the needed maintenance are generated and the user can then view them by holding the device in any manner desired, one perhaps more comfortable than having the device oriented towards the street lamp for the duration of the maintenance video.

Computer Implementation

Components of the embodiments disclosed herein, which may be referred to as methods, processes, applications, programs, modules, engines, functions or the like, can be implemented by configuring one or more computers or computer systems using special purpose software embodied as instructions on a non-transitory computer readable medium. The one or more computers or computer systems can be or include standalone, client and/or server computers, which can be optionally networked through wired and/or wireless networks as a networked computer system.

Figure 8:
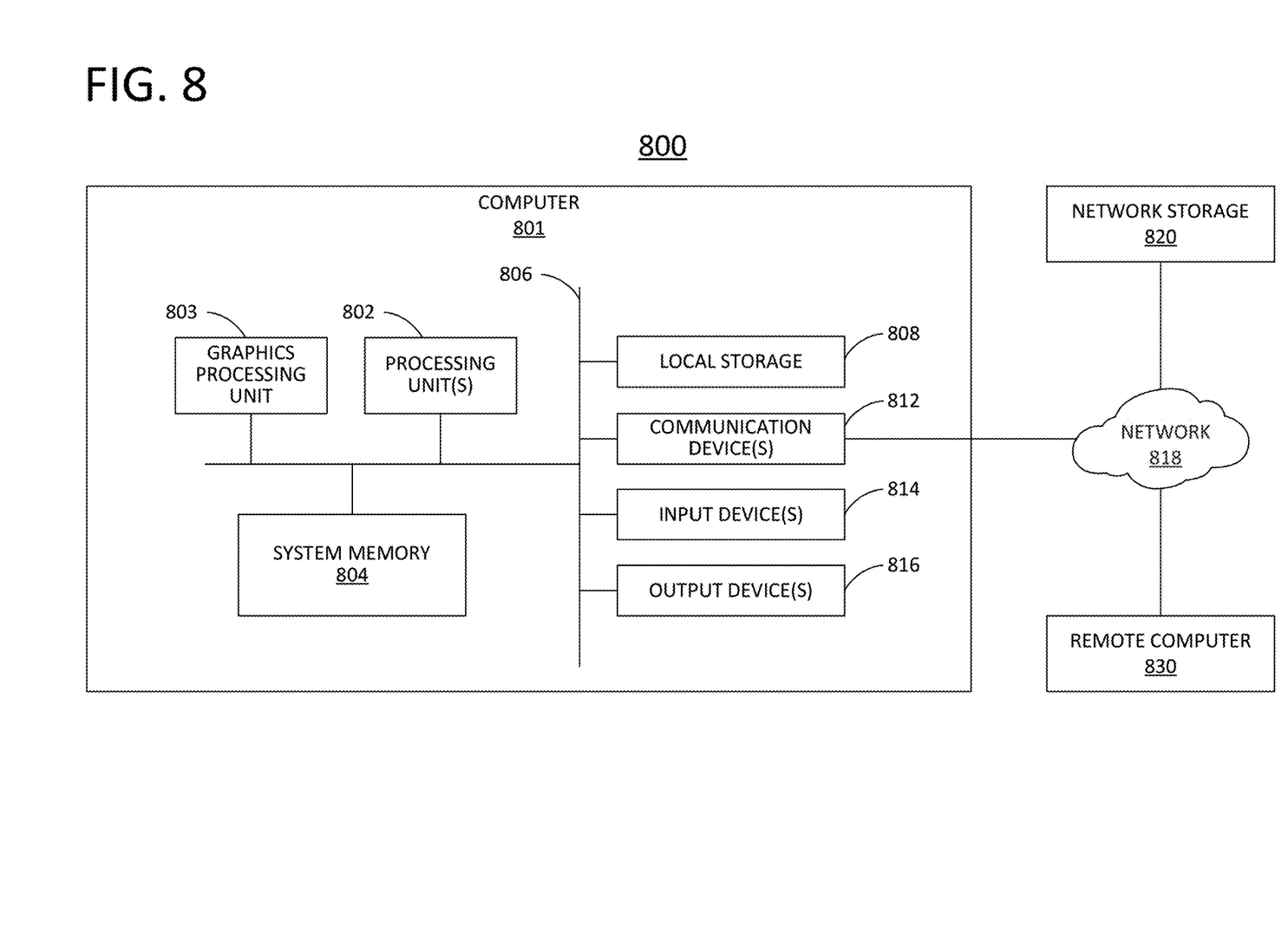
FIG. 8 illustrates a general computer architecture that can be appropriately configured to implement components disclosed in accordance with various embodiments.

FIG. 8 illustrates a general computer architecture 800 that can be appropriately configured to implement components disclosed in accordance with various embodiments. The computing architecture 800 can include various common computing elements, such as a computer 801, a network 818, and one or more remote computers 830. The embodiments disclosed herein, however, are not limited to implementation by the general computing architecture 800. The components and/or computing elements can include, for example, a user mobile device executing a query application and/or a server operating a database and responding to the query.

Referring to FIG. 8, the computer 801 can be any of a variety of general purpose computers such as, for example, a server, a desktop computer, a laptop computer, a tablet computer or a mobile computing device. The computer 801 can include a processing unit 802, a system memory 804 and a system bus 806.

The processing unit 802 can be any of various commercially available computer processors that can include one or more processing cores, which can operate independently of each other. Additional co-processing units, such as a graphics processing unit 803, also can be present in the computer. The system memory 804 can include volatile devices, such as dynamic random access memory (DRAM) or other random access memory devices. The system memory 804 can also or alternatively include non-volatile devices, such as a read-only memory or flash memory.

The computer 801 can include local non-volatile secondary storage 808 such as a disk drive, solid state disk, or removable memory card. The local storage 808 can include one or more removable and/or non-removable storage units. The local storage 808 can be used to store an operating system that initiates and manages various applications that execute on the computer. The local storage 808 can also be used to store special purpose software configured to implement the components of the embodiments disclosed herein and that can be executed as one or more applications under the operating system.

The computer 801 can also include communication device(s) 812 through which the computer communicates with other devices, such as one or more remote computers 830, over wired and/or wireless computer networks 818. Communications device(s) 812 can include, for example, a network interface for communicating data over a wired computer network. The communication device(s) 812 can include, for example, one or more radio transmitters for communications over Wi-Fi, Bluetooth, and/or mobile telephone networks.

The computer 801 can also access network storage 820 through the computer network 818. The network storage can include, for example, a network attached storage device located on a local network, or cloud-based storage hosted at one or more remote data centers. The operating system and/or special purpose software can alternatively be stored in the network storage 820.

The computer 801 can have various input device(s) 814 such as a keyboard, mouse, touchscreen, camera, microphone, accelerometer, thermometer, magnetometer, or any other sensor. Output device(s) 816 such as a display, speakers, printer, eccentric rotating mass vibration motor can also be included.

The various storage 808, communication device(s) 812, output devices 816 and input devices 814 can be integrated within a housing of the computer, or can be connected through various input/output interface devices on the computer, in which case the reference numbers 808, 812, 814 and 816 can indicate either the interface for connection to a device or the device itself as the case may be.

Any of the foregoing aspects may be embodied in one or more instances as a computer system, as a process performed by such a computer system, as any individual component of such a computer system, or as an article of manufacture including computer storage in which computer program instructions are stored and which, when processed by one or more computers, configure the one or more computers to provide such a computer system or any individual component of such a computer system. A server, computer server, a host or a client device can each be embodied as a computer or a computer system. A computer system may be practiced in distributed computing environments where operations are performed by multiple computers that are linked through a communications network. In a distributed computing environment, computer programs can be located in both local and remote computer storage media.

Each component of a computer system such as described herein, and which operates on one or more computers, can be implemented using the one or more processing units of the computer and one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the processor or computer to implement various components or data structures.

Components of the embodiments disclosed herein, which may be referred to as modules, engines, processes, functions or the like, can be implemented in hardware, such as by using special purpose hardware logic components, by configuring general purpose computing resources using special purpose software, or by a combination of special purpose hardware and configured general purpose computing resources. Illustrative types of hardware logic components that can be used include, for example, Field-programmable Gate Arrays (FPGAs), Application-specific Integrated Circuits (ASICs), Application-specific Standard Products (ASSPs), System-on-a-chip systems (SOCs), and Complex Programmable Logic Devices (CPLDs).

Although the subject matter has been described in terms of certain embodiments, other embodiments, including embodiments which may or may not provide various features and advantages set forth herein will be apparent to those of ordinary skill in the art in view of the foregoing disclosure. The specific embodiments described above are disclosed as examples only, and the scope of the patented subject matter is defined by the claims that follow.

In the claims, the term "based upon" shall include situations in which a factor is taken into account directly and/or indirectly, and possibly in conjunction with other factors, in producing a result or effect. In the claims, a portion shall include greater than none and up to the whole of a thing.

The invention claimed is:

1. A method performed by a computer, the method comprising:
  determining an address state of a mobile device;
  determining a time associated with the determined address state;
  subsequent to the determined time, querying a database using the determined address state and the determined time to identify a thing having a geographic location matching the determined address state at the determined time; and
  based on the querying of the database, presenting to a user information related to a state of the thing at the determined time.

2. The method of claim 1, wherein the address state comprises a physical location of the mobile device.

3. The method of claim 2, wherein the address state further comprises a pointing direction of the mobile device.

4. The method of claim 3, wherein the address state further comprises a field of view of an imaging device associated with the mobile device.

5. The method of claim 1, wherein the thing is a physical object.

6. The method of claim 5, wherein the information is presented in an augmented reality interface aligned with a captured image of the object.

7. The method of claim 6, wherein the information comprises a maintenance record for the object.

8. The method of claim 1, wherein the database is a database of geolocated objects having time-based states.

9. The method of claim 8, wherein the querying comprises performing a proximity comparison between the location of the mobile device and locations of the geolocated objects.

10. The method of claim 1, wherein the identified thing is an electronic billboard displaying different advertisements at different times, and wherein the state of the thing at the determined time comprises information related to an advertisement displayed on the electronic billboard at the determined time.

11. The method of claim 1, wherein the identified thing is a location, and wherein the state of the thing at the determined time comprises an identification of a moveable object present at the location at the determined time.

12. The method of claim 11, wherein the moveable object is a person.

13. The method of claim 11, wherein the moveable object is a vehicle.

14. The method of claim 13, wherein the vehicle is a train and wherein the location is a train station.

15. The method of claim 1, wherein the thing is an event.

16. The method of claim 15, wherein the event is selected from a group consisting of: a sporting event, a concert, and a show.

17. The method of claim 15, wherein the event is a promotional offer.

18. The method of claim 17, further comprising determining that the promotional offer has been presented to fewer than a maximum number of allowed users.

19. The method of claim 2, wherein the address state comprises a velocity of the mobile device.

20. The method of claim 1, wherein the address state of the mobile device is determined in response to a user input to the mobile device.

* * * * *